(No Model.)
A. NITTINGER, Sr.
MEAT OR VEGETABLE CUTTER, FRUIT PRESS, &c.
No. 447,581. Patented Mar. 3, 1891.
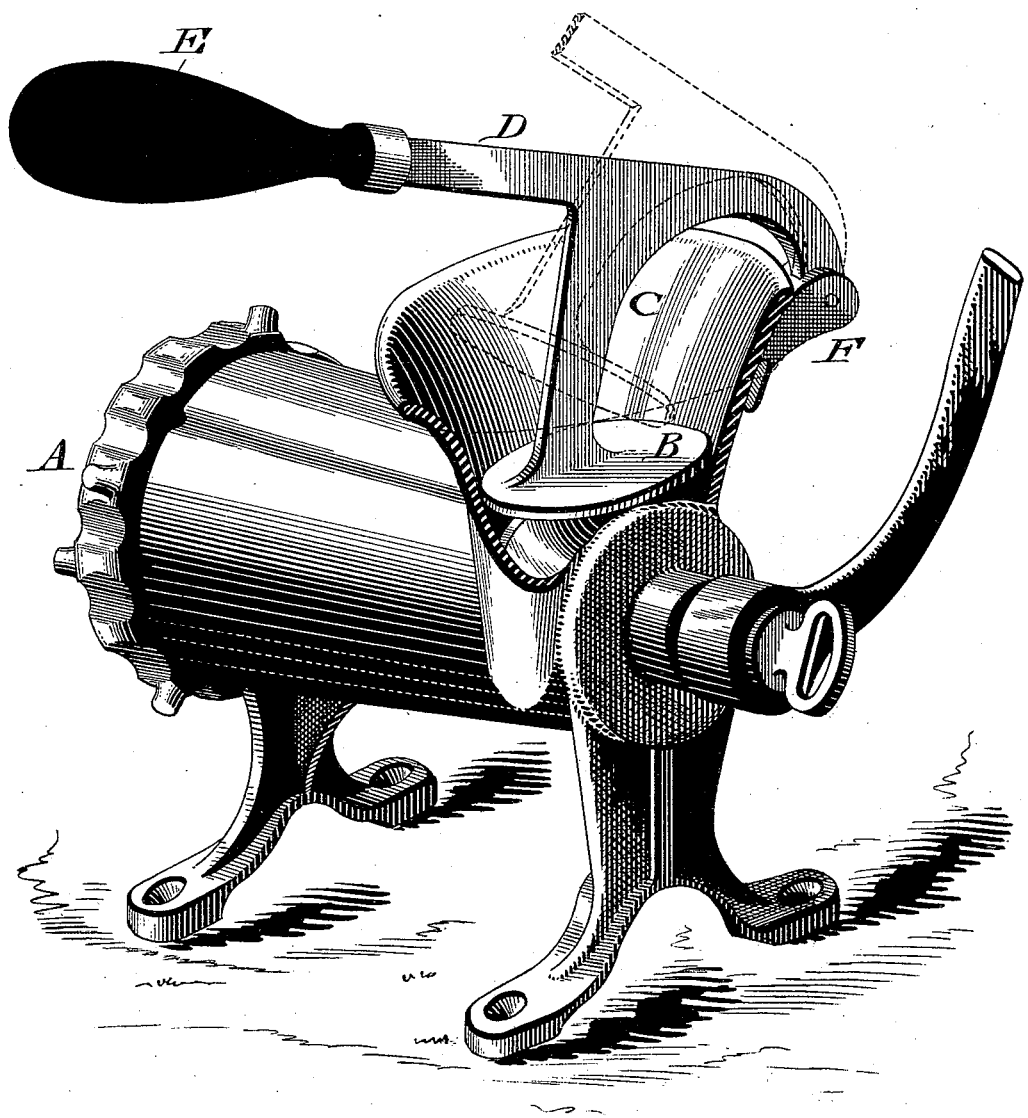
WITNESSES:
INVENTOR
ATTORNEY.

UNITED STATES PATENT OFFICE.

AUGUST NITTINGER, SR., OF PHILADELPHIA, PENNSYLVANIA.

MEAT OR VEGETABLE CUTTER, FRUIT-PRESS, &c.

SPECIFICATION forming part of Letters Patent No. 447,581, dated March 3, 1891.

Application filed November 6, 1890. Serial No. 370,581. (No model.)

*To all whom it may concern:*

Be it known that I, AUGUST NITTINGER, Sr., a citizen of the United States, residing in the city and county of Philadelphia, State of Pennsylvania, have invented a new and useful Improvement in Meat or Vegetable Cutters, Fruit-Presses, &c., which improvement is fully set forth in the following specification and accompanying drawing.

My invention consists in providing a meat and vegetable cutter, fruit-press, &c., with means whereby the material to be cut, pressed, &c., may be forced against the cutter or pressing device, so as to avoid the insertion of the fingers or hand for such purpose, thus guarding the same against injury, the means employed also serving to close the hopper, so that foreign substances are prevented from entering the same.

The figure represents a perspective view, partly broken away, of a meat-cutter embodying my invention.

Referring to the drawing, A designates a meat-cutter, which, excepting the features of my invention applied thereto, is of well-known form and construction.

B designates a plunger, piston, or head, which is connected by an arm C with a lever D, the latter being provided with a suitable handle E and pivoted to the ear F, which is secured to the hopper G of the cutter, it being noticed that the head B is so located that it is adapted to enter said hopper, and may be removed therefrom. The screw H extends from one end of the casing J across the base of the hopper.

The operation is as follows: The lever is raised, whereby the head is withdrawn from the screw or cutter of the machine adjacent thereto, and the hopper may be supplied with material to be cut, pressed, &c., after which the head may be returned into the hopper and forced against the material when it is desired to feed the same in such manner, especially as the supply lessens, whereby the insertion of the fingers or hand of the operator into the hopper in order to effect such forcing may cause the fingers unintentionally to enter between the threads of the screw, whereby said fingers are caught between the wall of the casing and the rotating screw, the portion of the screw below the base of the hopper being uncovered or exposed, and liable to draw in the fingers by the screw against the adjacent wall of the chamber K, thereby crushing off or otherwise badly mutilating the fingers or hand. Furthermore, when the head is at or about its lowest point and the cutter is not in use, said head closes the base of the hopper, thus preventing the introduction of nails and other foreign substances into the body of the cutter, and the consequent injury to the screw or cutting mechanism. It is evident that the lever may be pivoted to the body of the cutter, the covering of the same, or the lid of the hopper when so provided, the plunger, piston, or head, however, entering the hopper, so as to push the material toward the exposed portion of the screw and at the same time prevent the use of the hand or fingers for that purpose.

Having thus described my invention, what I claim as new, and desire to secure by Letters Patent, is—

A meat-cutter, &c., having a casing, a hopper, a rotary screw in said casing with an exposed portion at the base of the hopper, ears secured to said hopper, a lever pivoted to said ears and having a suitable handle, and a depending arm attached to said lever and provided with a head adapted to work in and close said hopper above said exposed portion of the screw, said parts being combined substantially as described.

AUGUST NITTINGER, SR.

Witnesses:
JOHN A. WIEDERSHEIM,
A. P. JENNINGS.